United States Patent

Coutant et al.

Patent Number: 5,842,144
Date of Patent: Nov. 24, 1998

[54] DEFAULT MODE CONTROL SYSTEM FOR A SPLIT TORQUE TRANSMISSION

[75] Inventors: Alan R. Coutant, Chillicothe; Michael G. Cronin; Kenneth P. Liesener, both of Peoria; Jerry D. Marr, Metamora; Sanjay Rajagopalan, Peoria, all of Ill.

[73] Assignee: Caterpillar Inc., Peoria, Ill.

[21] Appl. No.: 939,266

[22] Filed: Sep. 29, 1997

Related U.S. Application Data

[63] Continuation of Ser. No. 477,751, Jun. 7, 1995, abandoned.

[51] Int. Cl.$^6$ ................................................ B60K 41/00
[52] U.S. Cl. ............................................. 701/62; 477/41
[58] Field of Search ..................... 477/34, 52, 65, 477/68, 69, 41; 701/51, 62, 63, 69

[56] References Cited

U.S. PATENT DOCUMENTS

| | | | |
|---|---|---|---|
| 4,648,040 | 3/1987 | Cornell et al. | 364/424.1 |
| 4,663,713 | 5/1987 | Cornell et al. | 364/424.1 |
| 4,663,714 | 5/1987 | Cornell et al. | 364/424.1 |
| 4,747,056 | 5/1988 | Yamamoto et al. | 364/424.092 |
| 4,779,490 | 10/1988 | Milunas et al. | 364/424.092 X |
| 4,849,899 | 7/1989 | Cote et al. | 364/424.092 |
| 4,862,362 | 8/1989 | Kurihara et al. | 364/424.092 |
| 4,945,484 | 7/1990 | Cote et al. | 364/424.092 |
| 4,951,205 | 8/1990 | Lowe et al. | 364/424.092 |
| 5,033,328 | 7/1991 | Shimanaka | 364/424.092 X |
| 5,088,353 | 2/1992 | Yoshida | 364/424.092 X |
| 5,216,938 | 6/1993 | Yamaguchi | 364/424.092 X |
| 5,355,675 | 10/1994 | Mayhugh et al. | 60/327 |
| 5,408,896 | 4/1995 | Vogt | 74/361 |

Primary Examiner—Michael Zanelli
Assistant Examiner—Edward Pipala
Attorney, Agent, or Firm—Calvin E. Glastetter

[57] ABSTRACT

A default mode control system for controlling a split torque transmission is disclosed. The default mode control system monitors various inputs to the control to detect an on board electrical, electronic fault or mechanical, hydraulic fault. When a fault is detected, the default mode control will recover from the default and then will limit operation of the split torque transmission based on the fault input.

6 Claims, 3 Drawing Sheets

FIG_1

DEFAULT MODE CONTROL SYSTEM FOR A SPLIT TORQUE TRANSMISSION

This is a file wrapper continuation of application Ser. No. 08/477,751, filed Jun. 7, 1995, now abandoned.

TECHNICAL FIELD

This invention relates generally to a split torque transmission system and more particularly to a control system and method of controlling the split torque transmission during a default mode.

BACKGROUND ART

In known systems, the split torque transmission control does not have a default mode control arrangement for controlling the split torque transmission. Many times it is desirable to have a default mode control for limiting the operation of the split torque transmission when a fault is detected. It is beneficial to have a default mode control which monitors various inputs from the transmission control to detect and report a fault condition to the default control and take appropriate action to control or limit the operation of the split torque transmission.

DISCLOSURE OF THE INVENTION

In one aspect of the present invention a method is provided for controlling a split torque transmission having a hydrostatic transmission, a mechanical transmission, a transmission control, during a default mode. The method includes the steps of monitoring the electrical components of the split torque transmission control, detecting a fault within the electrical components, monitoring the status of the mechanical, the hydrostatic transmission of the split torque transmission, detecting an event of the mechanical transmission and the hydrostatic transmission, and controlling the split torque transmission relative to the detected fault or the detected event.

The present invention provides a method which monitors various components of the split torque transmission and the control arrangement to control or limit the operation of the split torque transmission during a default mode.

BEST MODE FOR CARRYING OUT THE INVENTION

Figure 1:
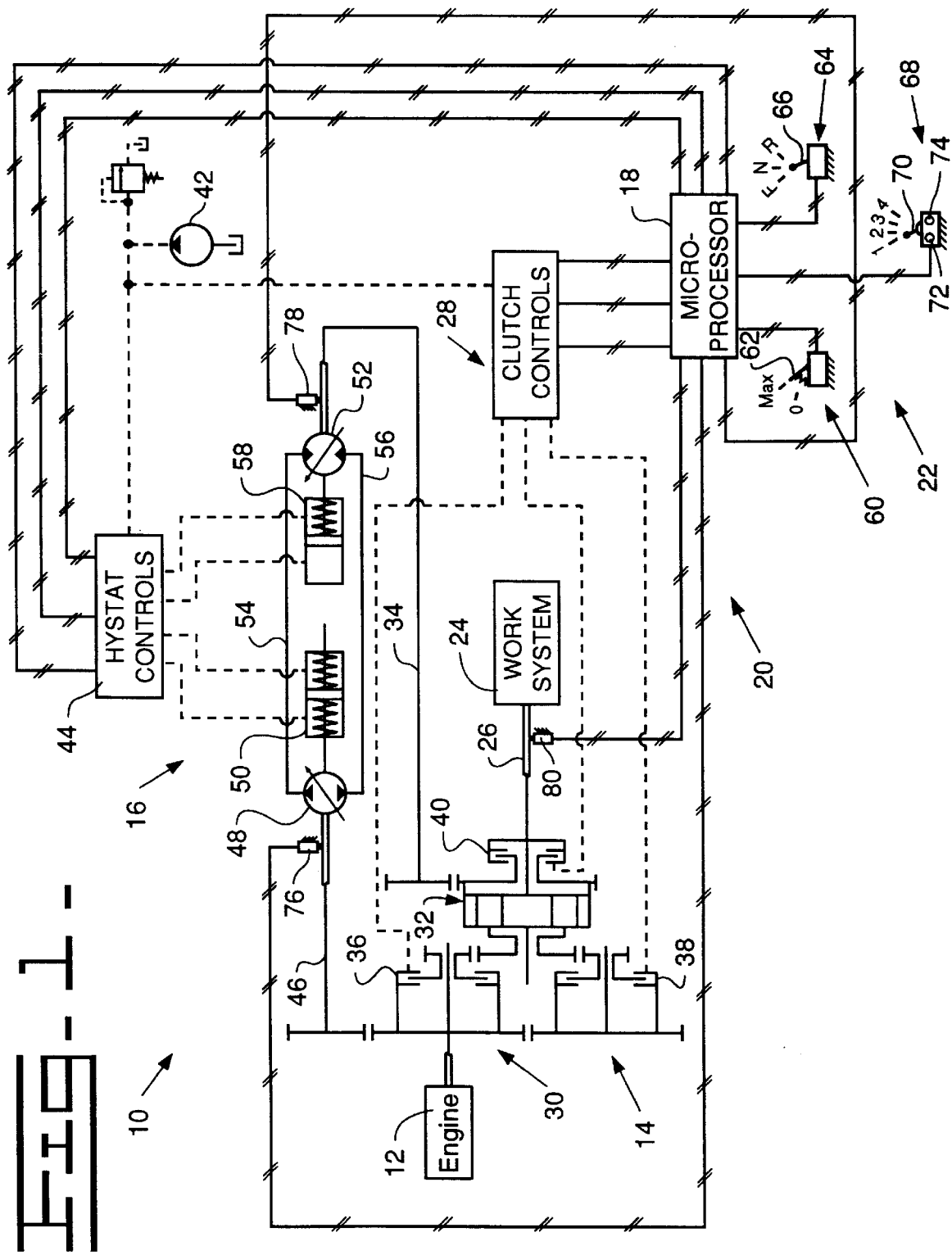
FIG. 1 is a diagrammatic illustration of a split torque transmission utilizing the subject invention.

A transmission system 10 is shown for use in a machine (not shown) having an engine 12. The split torque transmission system 10 includes a mechanical transmission 14, a hydrostatic transmission 16, a microprocessor 18, a sensing arrangement 20 and a command input arrangement 22. A work system 24 is connected to the split torque transmission 10 by a final drive shaft 26.

The mechanical transmission 14 and an associated clutch control arrangement 28 is operatively connected to the engine 12 through a gear arrangement 30. The mechanical transmission 14 includes a summing planetary arrangement 32 operatively connected to both the engine 12 through the gear arrangement 30 and to the hydrostatic transmission 16 through a motor output shaft 34. The output of the summing planetary arrangement 32 is connected to the final drive shaft 26. The mechanical transmission 14 also includes directional high speed clutches 36, 38 and a low speed clutch 40. The clutch control arrangement 28 is connected to a source of pressurized pilot fluid, such as a pilot pump 42 and the microprocessor 18 and is operative in response to electrical signals from the microprocessor 18 to control engagement and disengagement of the respective speed clutches 36, 38 and 40.

The hydrostatic transmission 16 and an associated hydrostatic control arrangement 44 is operatively connected to the engine 12 through a pump input drive shaft 46. The hydrostatic transmission 16 includes a variable displacement pump 48, a pump displacement controller 50, a variable displacement motor 52 fluidly connected to the variable displacement pump 48 by conduits 54, 56, and a motor displacement controller 58. The hydrostatic control arrangement 44 is connected to the pilot pump 42 and the microprocessor 18 and is operative in response to electrical signals from the microprocessor 18 to control movement of the respective pump and motor displacement controller 50, 58.

The command input arrangement 22 includes a speed input mechanism 60 having a speed pedal 62 moveable from a maximum speed position to a zero speed position, a direction control mechanism 64 having a direction control lever 66 selectively moveable from a neutral position to a forward or a reverse position, and a speed range control mechanism 68 having a speed lever 70 selectively moveable between a first position and a fourth position. A range increment button 72 and a range decrement button 74 are provided to modify the maximum allowable speed in each range. The speed range control mechanism could be continuously moveable from a minimum position to a maximum position without having specified positions, without departing from the scope of the invention.

The sensing arrangement 20 includes a first speed sensor 76 operative to sense the speed of the transmission input 46 and the pump input shaft 46 and direct an electrical signal representative thereof to the microprocessor 18. A second speed sensor 78 is operative to sense the speed of the motor output shaft 34 and direct an electrical signal representative thereof to the microprocessor 18. A third speed sensor 80 is operative to sense the speed of the output drive shaft 26 and direct an electrical signal representative thereof to the microprocessor 18.

Figure 2:
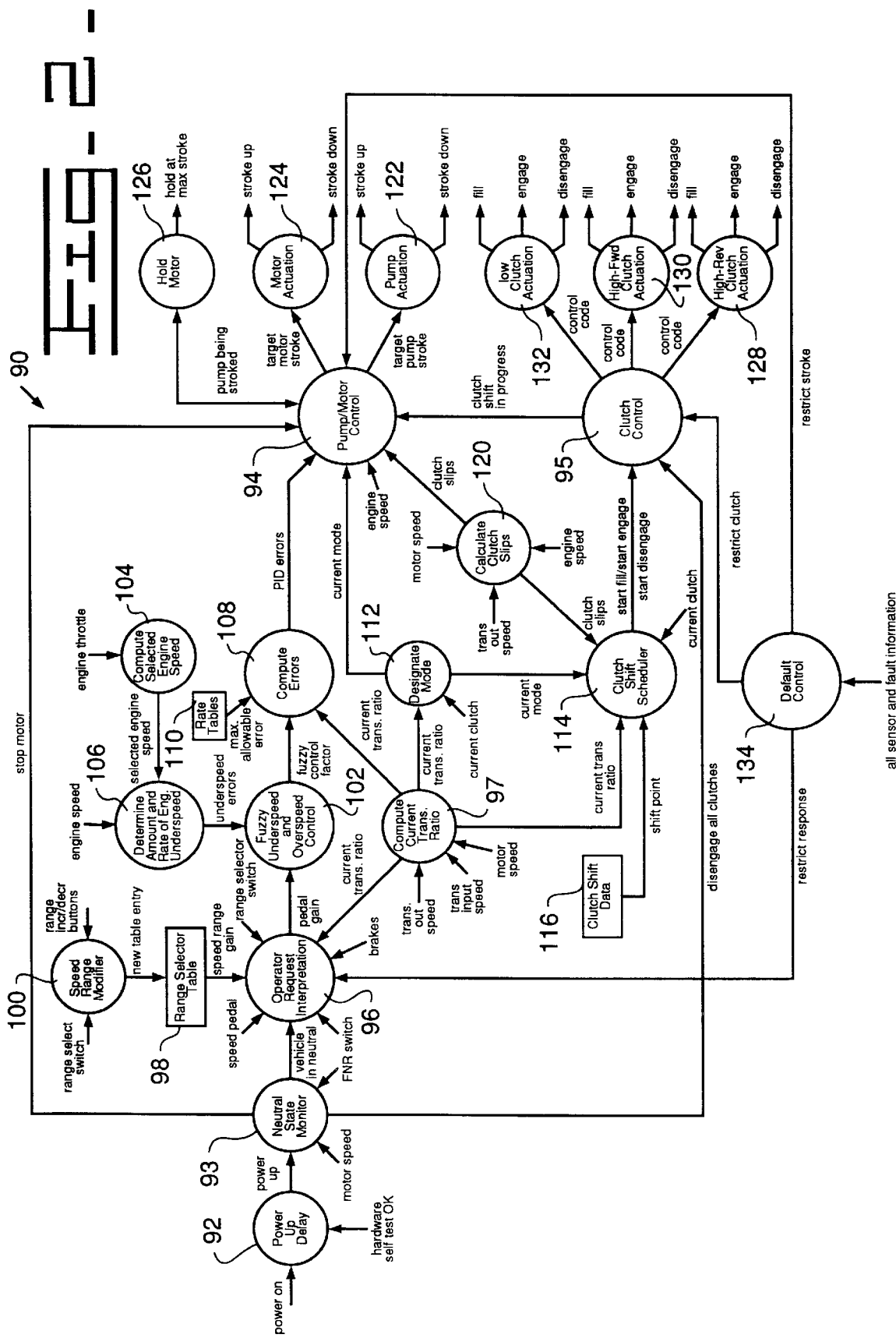
FIG. 2 is a flow chart of the overall operation of the transmission controller according to the present invention.

Referring to FIGS. 1 and 2, the methodology of the transmission control within the microprocessor 18 is shown at 90. When the key of the machine is turned on, powerup delay of the transmission control 90 occurs in module 92. At this stage power is received from the start switch but activation of the transmission is delayed until the low-level hardware self test comes up error free. If an error were detected, the startup procedure would be suspended, and the operator would be required to turn off the power switch before normal operation is again possible. If no error is detected powerup state can be achieved even if the direction control lever 66 is not at the neutral position, however the transmission can not be activated until the direction control lever 66 is moved to the neutral position. After the necessary checks are completed the powerup command is sent to module 93 which is the neutral state monitor. The transmission ratio remains zero until the operator moves the direction control lever 66 from the neutral position. The module 93 also ensures that the machine is in a state of "true" neutral at startup. The signal for "true" neutral can only be achieved when an input from the direction control lever 66 is received stating that the lever is in neutral and a signal is received stating the motor speed is zero. A signal is sent to the hystat controls 44, also shown as module 94, to the pump to stop the motor rotation and a signal is sent to the clutch control 28, also shown as module 95, to disengage all the clutches. These signals are sent only in the event that a "true" neutral is not present when the powerup state is reached. After all inputs are determined to be correct a signal indicating the machine is in neutral is sent to module 96 which interprets the operator requests.

Module 96 computes the operator intended transmission ratio as indicated by the position inputs from the speed pedal 62, the speed range lever 70, the direction control lever 66, current transmission ratio signal from a module 97 and an operator modifiable speed range gain from a range selector table 98 and a module 100 which is a speed range modifier. Module 97 receives three input signals, transmission output speed, motor speed and transmission input speed, and outputs a current transmission ratio to module 96 and three other modules as will be described later. Module 100 gives the operator the option of selecting the sensitivity of the speed range control mechanism 68 by changing the table entries in the range selector table 98. The table entries determine the speed range lever gains, which in turn controls the speed pedal 62 sensitivities. The range control mechanism 68 has four positions, each corresponding to different sensitivities for the speed pedal 62. The range control mechanism could be continuously moveable from a minimum position to a maximum position and not having four specified positions. The machine has a default value range selector table 98 which can be modified by the operator depressing the range increment button 72 or the range decrement button 74. Depressing both buttons 72, 74 simultaneously will return the table value to the default value. The table entry will be sent from module 100 to range selector table 98 which will send a speed range gain signal to the module 96. Module 96 will send a pedal gain signal to module 102 which is a fuzzy underspeed and overspeed control.

A module 104 receives an engine throttle signal and computes a selected engine speed signal which is sent to a module 106. Module 106 receives the selected engine speed signal and the actual transmission input speed signal and computes the difference between the two incoming signals and passes the signal as an output to the module 102. Module 102 will modify the operator generated machine speed request based upon the engine speed information from module 106, and send this modified request to module 108. Module 108 also receives a current transmission ratio signal from module 97. Module 108 compares the requested command signal with the maximum allowable rate of change, for the current transmission ratio from module 97, which are contained in table 110. The rates in table 110 are determined from the operator comfort and machine parameter perspective. If the operator inputs are not within a predetermined range of the rate tables 110, module 108 will modify the signal to the maximum or minimum allowed value within the range, if the signal is within the range no modification is needed, and sends the signal to module 94 which controls the pump and motor.

A module 112 receives a current transmission ratio signal from module 97, a current clutch signal and sends a current mode signal to the module 94 and to a module 114 which is a clutch shift scheduler. Module 114 also receives a current transmission ratio signal from module 97, a shift point signal from a clutch shift data chart 116, a current clutch signal, a clutch slip signal from a module 120 which calculates clutch slips. Module 114 determines which clutch to disengage, which clutch to engage, which clutch needs to be filled in anticipation of engagement, determines when these operation need to be completed to ensure smooth clutch changes and sends a signal to the clutch control module 95 to indicate exactly when to start clutch fill, start clutch disengagement or start clutch engagement.

The clutch slip module 120 receives a motor speed signal, a transmission output speed signal, a transmission input speed signal and calculates a clutch slip or relative speed signal. The clutch slip signal is sent to the pump/motor control module 94 and the clutch shift scheduler module 114.

Module 94 sends a target pump stroke signal to a module 122, which is the pump actuator, indicating when and how to stroke the pump and also sends a target motor stroke signal to a module 124, which is the motor actuator, indicating when and how to stroke the motor. The module 94 also sends a pump being stroked signal to a module 126 which holds the motor at a maximum stroke during pump stroke. Modules 122, 124 compute the actual numeric value that is output to the pump/motor swashplate actuating solenoids in response to the target signal supplied by module 94.

Module 95 interprets the inputs coming from module 114, which is the clutch shift scheduler, and sends a control code to a high reverse clutch actuation module 128, a high forward clutch actuation module 130, and a low clutch actuation module 132. Modules 128, 130 and 132 produce the actual numeric clutch actuation commands given to the control codes from module 95. The modules 128, 130 and 132 are programmed with the procedures to follow for clutch fill, clutch engagement and clutch disengagement.

A module 134, which is a default control, provides a control for operation of the split torque transmission in the event of a mechanical, hydraulic or electrical fault. The module 134 receives input from all sensors and fault information and sends signals to module 96, module 94 and module 95 to bring the transmission into a more favorable state and possibly restrict transmission operation until the fault is corrected.

Figure 3:
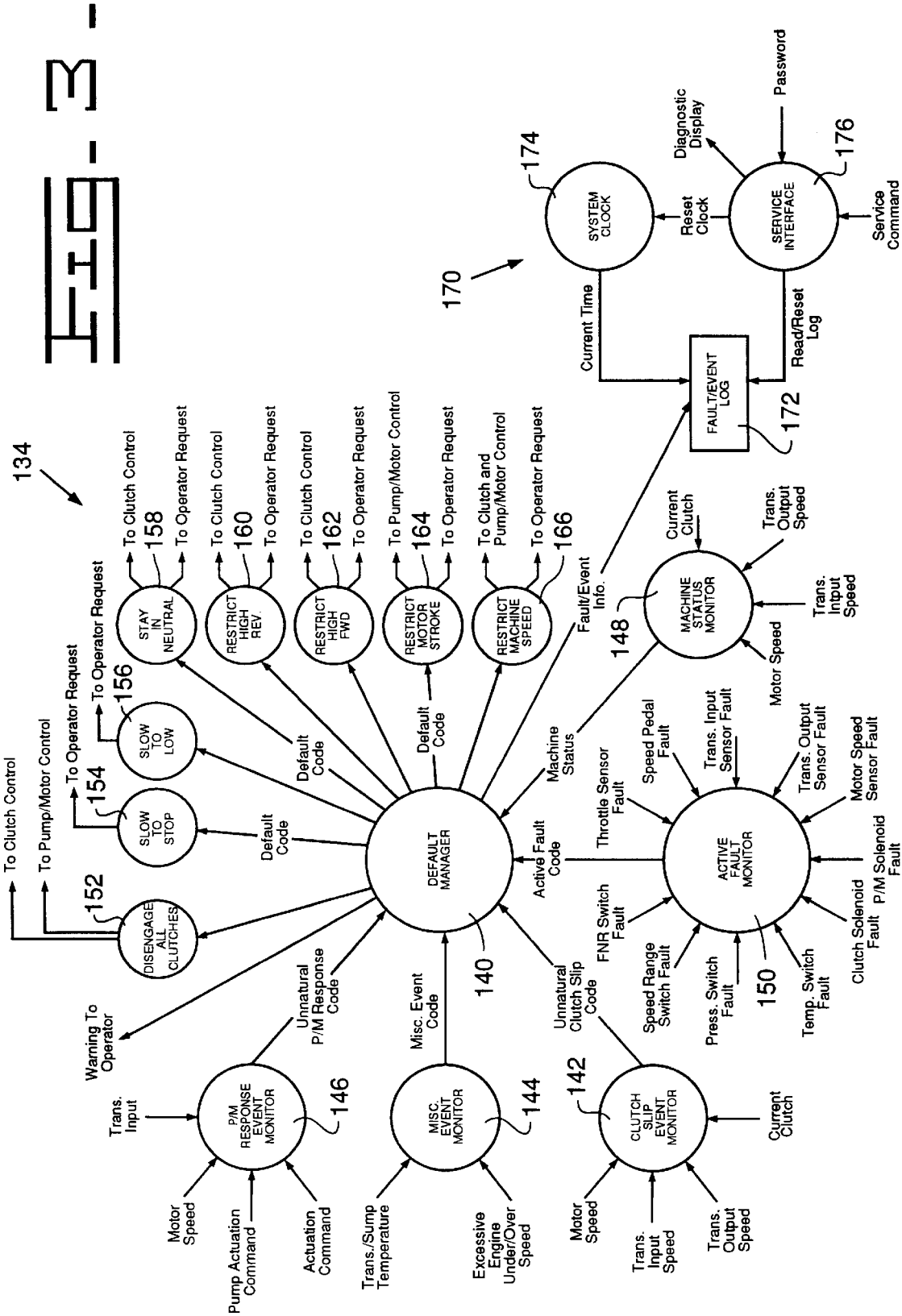
FIG. 3 is a flow chart of the default mode control according to the present invention.

Referring to FIG. 3, the low level software of the default control module 134 is shown. The default control 134 includes a default manager module 140 which receives various inputs and sends output signals to control various functions of the transmission based on the status of the various inputs. A clutch slip event module 142 monitors four inputs, such as motor speed, transmission input speed, transmission output speed, current clutch signal and determines if a clutch is slipping. If the clutch is slipping a abnormal clutch slip code signal is sent to the default manager module 140. A miscellaneous event module 144 monitors a transmission sump temperature, a engine underspeed/overspeed signal and sends a miscellaneous event code signal to the default manager module 140. A pump/motor response event module 146 monitors four input signals, such as, transmission input speed, motor speed, pump actuation command, motor actuation command and if necessary sends a abnormal pump/motor response code to the default manager module 140. Modules 142, 144, 146 detect "events" which relate to the status of the mechanical or hydraulic components and also failures for any reason that occur and are detected during the course of machine operation. The events are deduced from the system status by the default control system and sent to the default manager module 140 for controlling the transmission in respect to signal received.

A machine status module 148 monitors four input signals, such as current clutch, motor speed, transmission input speed, transmission output speed and determines the machine status and sends a machine status signal to the default manager 140.

An active fault module 150 monitors fault signals from various electrical components and send an active fault code to the default manager module 140. The fault module 150 monitors the sensors relating to the throttle, speed pedal, transmission input speed, transmission output speed, motor speed. The fault module 150 monitors the clutch solenoid, the pump/motor solenoid. The fault module 150 also monitors various switches, such as temperature, pressure, speed range and directional switch. A "fault" refers to any electrical or electronic failures within the system components on board the machine. The default manager and low level software detects and reports the status to the default control which takes the appropriate action.

The default manager module 140 receives signals from modules 142–150, and sends default code signals, based on the inputs, to various modules of the default control 134 for controlling the transmission. The default manager module 140 sends a signal to a module 152 to disengage all clutches. Module 152 will then send a signal to the clutch control to disengage the clutch and also send a signal to the pump/motor control. A default signal is sent to a module 154 to slow the machine to a stop and a signal is sent from the module 154 to the operator request module 96, as shown in FIG. 2, to control the transmission. A default signal is sent to module 156 to slow the machine to low and a signal is sent from the module 156 to the operator request module 96 to control the transmission. A default signal is sent to a module 158 to keep the transmission in neutral. A default signal is sent to a module 160 to restrict high reverse clutch. A default signal is sent to a module 162 to restrict high forward clutch. A default signal is sent to a module 164 to restrict motor stroke. A default signal is sent to a module 166 to restrict machine speed. In most detected occurrences of a "fault" or "event" a signal 168 will alert the operator. In response to fault codes, such as motor speed sensor, pressure switch, temperature switch, received by the default manager module the transmission is allowed to operate in the full range, however the warning signal 168 is sent to alert the operator of the malfunction.

A service control 170 is provided to make service easier to preform. The service control includes a fault/event log 172 which records all occurrences of a "fault" or "event". A system clock module 174 will maintain the current time in the fault/event log 172 and also indicated when an error occurred. A service interface module 176 to retrieve the fault/event log 172, reset the system clock, reset the service control 170 and to send a signal to a diagnostic display.

Industrial Applicability

In operation of the subject embodiment, power is supplied to module 92, however power up is delayed until the self test is completed. When the self test is completed module 93 monitors the inputs and determines if the transmission is in neutral. with the transmission in neutral a signal is send to module 96 which allows the module to accept the operator inputs from the speed pedal 62, the directional lever 66, the range selector lever 70 and the current transmission ratio from module 97. Module 97 monitors the speed sensors 76, 78, 80 and computes the current transmission ratio which is sent to module 96. The directional control lever is moved to select a direction of travel. A signal is sent to the fuzzy control module 102 indicating the operators intent and directs the appropriate signals to the hydrostatic control 44, 94 and the clutch control 28, 95. Initially, the hydrostatic transmission 16 increases the speed of the machine by adjusting the respective displacement of the variable displacement pump 48 and the variable displacement motor 52 and then controlling the respective speed clutches 36,38,40 to continue to increase the machine speed.

When a "fault" or "event" is detected a warning is sent to notify the operator and possibly restrict operation of the split torque transmission until the system is reset. There are two types of possible system resets, operator reset and service reset. The operator reset is performed by the operator and essentially involves shifting into neutral position on the directional control 64 and shifting out again or could require shutting down power to the machine and starting up again. The service reset is performed, after the problem is corrected, by accessing the service module 176. Various "faults" and "events" will require the default manager 140 to restrict transmission operations based on the specified occurrence.

When a "fault" is detected in the operator controls, such as the speed pedal 62 all clutches are disengaged and allow operator reset. When the speed range lever 70 is faulted the system will determine the highest lever position and slow the machine if necessary and retain the restriction until a service reset. When the directional control mechanism is faulted all clutches are disengaged if the failed direction is the current direction of travel, however full range of operation is allowed in the opposite direction. If a demand is made to move in the failed direction, the transmission goes to neutral and the restriction is retained until a service reset.

When a "fault" is detected in speed sensors, pressure switches, temperature switches the system can allow full range operation and alert the operator to the default or disengage all clutches and allow operator reset.

All "event" occurrences are logged in the fault/event log 172, regardless of whether there is a default response or not.

In view of the forgoing, it is readily apparent that the default mode control will restrict operation of the split torque transmission or alert the operator to a malfunction. The system monitors system status and operator intended inputs and detects "faults" and "events" and logs the occurrences and possibly restricts the transmission until the system is reset.

We claim:

1. A method for controlling a split torque transmission during a default mode, the split torque transmission having a hydrostatic transmission, a mechanical transmission, and a transmission control, comprising the steps of:

sensing the hydrostatic transmission, the mechanical transmission and a plurality of electrical components in the transmission control;

detecting a fault within the sensed transmission control;

detecting an event within the mechanical transmission and the hydrostatic transmission; and controlling the split torque transmission relative to the detected fault in the transmission control or the detected event in the split torque transmission.

2. The method according to claim 1 wherein the step of sensing the transmission control includes monitoring a sensing arrangement.

3. The method according to claim 1 wherein the step of sensing the transmission control includes the step of monitoring a command input arrangement.

4. The method of claim 1 including storing the detected fault and detected event in a fault/event log.

5. The transmission control of claim 4 including accessing the fault/event log for servicing a component.

6. A method for controlling a split torque transmission during a default mode, the split torque transmission having a hydrostatic transmission, a mechanical transmission and a transmission control, comprising the steps of:

sensing a plurality of electrical components within the split torque transmission control;

detecting a fault within the electrical components;

detecting an event within the mechanical transmission and the hydrostatic transmission; and controlling the split torque transmission relative to the detected fault or the detected event.

* * * * *